Figure 1A:
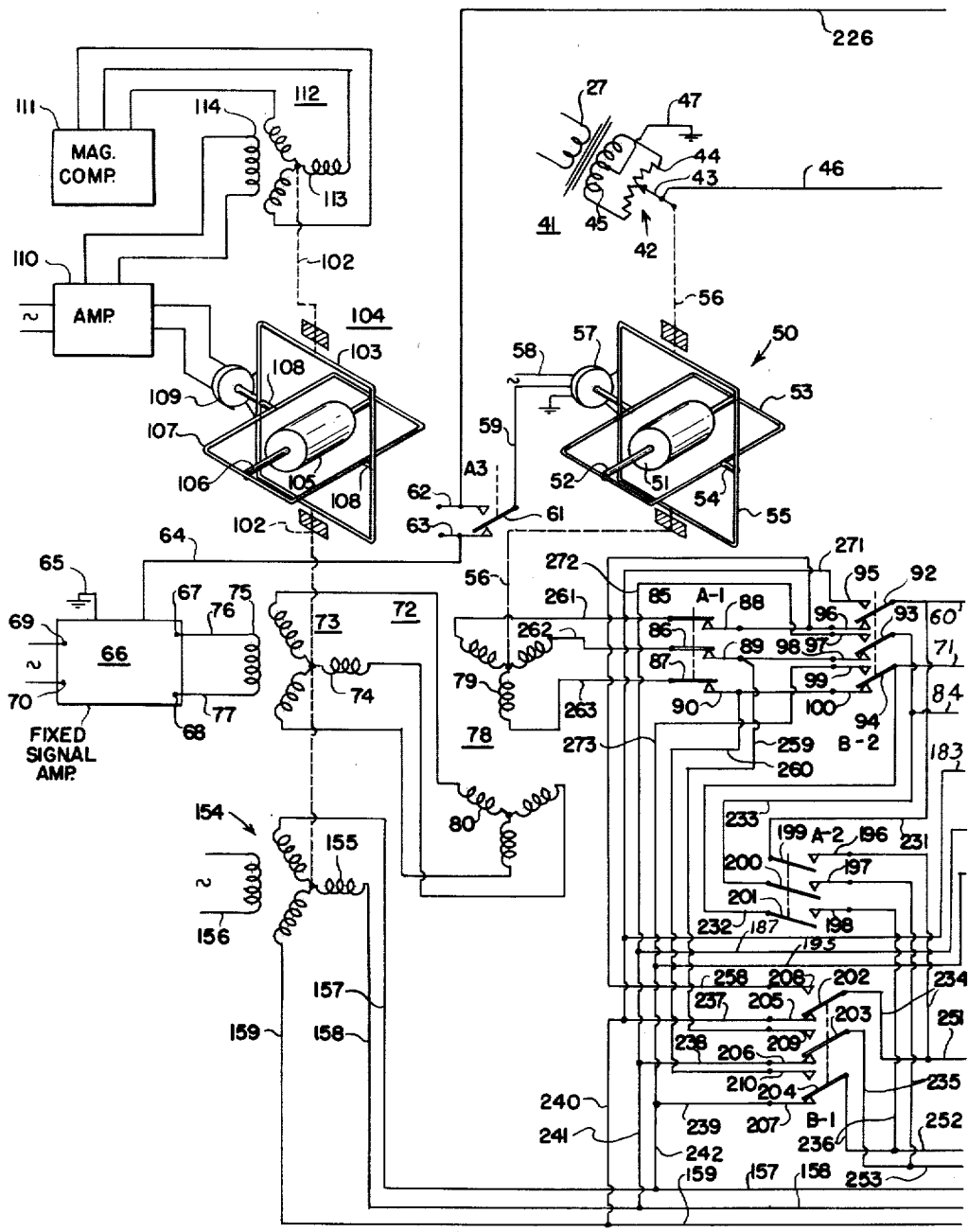

Aug. 7, 1956   W. A. STONE   2,757,887
AUTOMATIC PILOTS
Filed Aug. 21, 1952   2 Sheets-Sheet 1

INVENTOR.
WAYNE A. STONE
BY
George H. Fisher
ATTORNEY

INVENTOR.
WAYNE A. STONE

United States Patent Office 2,757,887
Patented Aug. 7, 1956

2,757,887

AUTOMATIC PILOTS

Wayne A. Stone, Minneapolis, Minn., assignor to Minneapolis-Honeywell Regulator Company, Minneapolis, Minn., a corporation of Delaware Application August 21, 1952, Serial No. 305,544

12 Claims. (Cl. 244—77)

This invention pertains to automatic steering mechanisms for dirigible craft and in particular to automatic pilots for aircraft.

It is an object of this invention to provide an automatic steering mechanism with an improved heading control arrangement using two directional gyroscopes, one providing at all times an accurate heading reference, the other selectively precessable to change craft heading.

A further object of this invention is to provide an improved heading control arrangement for a dirigible craft comprising two directional gyroscopes, one slaved to a magnetic compass and providing at all times an accurate heading reference, the other gyroscope being slaved to the first gyroscope but being also selectively angularly displaceable relative thereto to stabilize the craft heading and permit selected changes in heading.

It is a further object of this invention to control one set of indicators from said first gyroscope and another set of indicators from selective means which effectuate relatively angularly displacement of said two gyroscopes so that a comparison may be obtained between the crafts instant magnetic heading and the actual heading selected.

It is a further object of this invention to provide a heading control arrangement having a gyro magnetic compass for providing an accurate heading reference and a steering gyroscope slaved to said gyro magnetic compass but selectively angularly relatively displaceable therefrom under supervision from two remote stations and controlling craft heading.

In accordance with the present invention, I provide a heading control system for an aircraft wherein a gyro magnetic system, in which the compass gyroscope has low precession rates for slaving it to a magnetic compass and low erection rates for maintaining the gyro rotor parallel to the earth's surface, provides at all times an accurate heading reference. A second gyroscope is normally aligned with the compass gyroscope and operates through a servomotor on misalignment of the craft and gyroscope to stabilize craft heading. The second gyroscope may be selectively angularly displaced relative to the compass gyroscope to effect changes in heading in preselected amounts but at a fixed rate of heading change.

The second gyroscope may also be angularly displaced with respect to the compass gyroscope at selected variable rates to provide selected rates of turn of the craft.

A feature of the present invention is to provide two separate stations from which both selective changes of angular relationship of the second and compass gyroscopes may be initiated and to provide two indicators at each station one indicating the crafts magnetic heading and the other the selected angular relationship of the two gyroscopes.

While the compass gyroscope has been indicated as having low precession and erection rates for slaving and erection purposes, the second gyroscope preferably has higher precession and erection rates. The former to provide selected rates of craft heading change and the latter to maintain the rotor axis erected despite frictional or similar loads on the gyroscope aircraft control axis which tend to precess the rotor from its erected position.

Figure 1B:
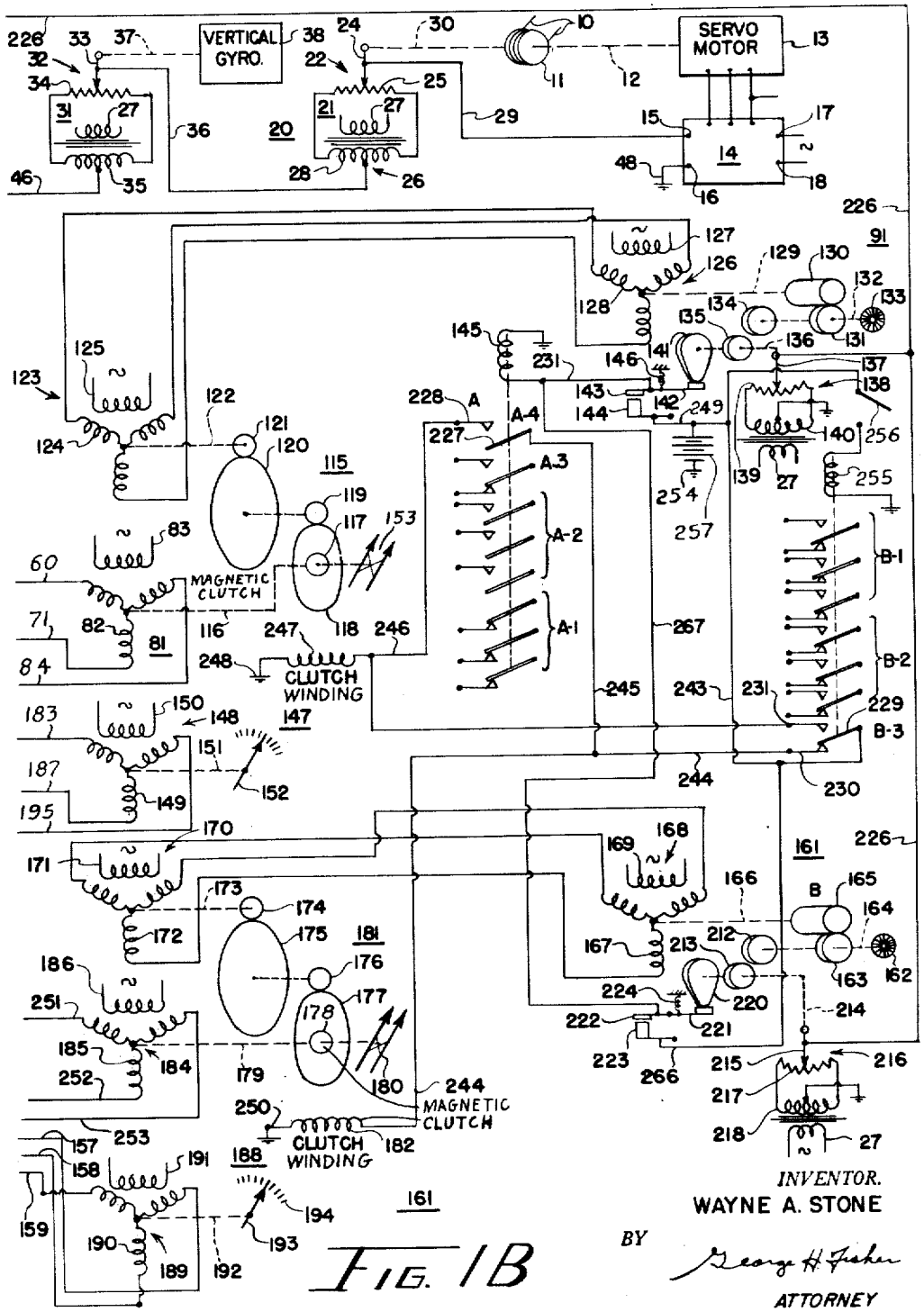

The above and other features of the invention will be apparent hereinafter upon consideration of the following description taken in conjunction with the accompanying drawing wherein:

Figures 1A and 1B together illustrate a schematic arrangement of the two directional heading control arrangements.

Referring to the drawing, the control surfaces such as the aileron or rudder (not shown) for controlling the heading of the aircraft are operated by cables 10 extending from a cable drum 11 which is supported on an output shaft 12 of a servomotor 13. The servomotor 13 is of the D. C. energized type having a pair of control windings which are alternatively energized to reversibly control the rotation of the motor. The energization of the motor control windings is controlled from an amplifier 14. The amplifier 14 comprises signal input terminals 15, 16, and power input terminals 17, 18. The amplifier is of the A. C. discriminator type and one or the other of the servomotor control windings is energized depending upon the phase relationship of the input voltage across terminals 15, 16 with respect to the voltage across power input terminals 17, 18. The amplifier-servomotor combination may thus be similar to that disclosed in Patent 2,466,702 to Hamby.

Control voltage signals applied across amplifier signal input terminals 15, 16 are obtained from a balanceable variable impedance network 20. Network 20 comprises a rebalancing network 21; a craft bank angle network 31; and a heading control network 41. Network 21 comprises a rebalancing potentiometer 22 having a slider 24 and a resistor 25 which is connected across a secondary winding 28 of a transformer 26 having a primary winding 27. A conductor 29 connects slider 24 with amplifier terminal 15. Slider 24 is positioned along resistor 25 by a follow-up operating connection 30 from the servomotor shaft 12.

Network 31 comprises a craft bank angle potentiometer 32 having a slider 33 and resistor 34. Resistor 34 is connected across a secondary winding 35 of the transformer 26. Since a primary winding of a transformer may supply a plurality of secondary windings, a common primary winding is indicated for the several secondary windings in the various networks. A conductor 36 connects slider 33 with a center tap of secondary winding 28 in network 21. Slider 33 is positioned along resistor 34 in accordance with the angle of bank of the aircraft through a suitable operating connection 37 from a vertical gyroscope 38. The vertical gyroscope 38 is of the type well known in the art having a rotor with three axes of angular freedom and in which one axis of freedom is the rotor spin axis which is maintained perpendicular to the earth's surface. The rotor in turn is additionally angularly movable about two respectively perpendicular horizontal axes.

Network 41, Figure 1A, comprises a heading control potentiometer 42 having a slider 43 and resistor 44. Resistor 44 is connected across a secondary winding 45 of transformer 26. A conductor 46 connects slider 43 with a center tap of secondary winding 35 in network 31. A conductor 47 extends from a center tap of secondary winding 45 to ground; and the amplifier input network is completed through ground to conductor 48 connected to terminal 16 of amplifier 14.

Slider 43 is positioned along resistor 44 from a gyroscope 50 to control the heading of the aircraft in three configurations namely: stabilized heading, preselected angular change in heading, and selective rates of change of heading.

Gyroscope 50 comprises a rotor 51 mounted for rotation about a horizontal axis 52 in an inner gimbal ring 53. The gimbal ring 53 is in turn carried about a horizontal axis 54 perpendicular to rotor spin axis 52 in an outer vertical gimbal ring 55. The outer gimbal ring 55 is rotatable about a vertical axis 56. Rotation of the gimbal ring 55 about axis 56 is communicated to slider 43. The gyroscope includes a precession motor 57 which applies a torque about the axis 54 to the inner ring 53 thereby in turn causing a precession of the gyroscope about axis 56. The gyroscope 50 includes erecting means (not shown) for maintaining the rotor axis 52 parallel with the surface of the earth.

The torque motor 57 may be of the capacitor inductive type having a line winding, a control winding, and an inductor or rotor. The field windings namely the line and control windings are secured to the vertical gimbal ring 55 and the rotor in turn is secured to inner gimbal ring 53 concentric with axis 54. The line winding has a conductor 58 extending to the source of alternating voltage, and the control winding has a conductor 59 extending to relay arm 61. The opposite ends of the line winding and control winding are connected to ground.

Relay arm 61 coacts with an out contact 63 and an in contact 62 and the arm and contacts form part of an A relay to be described. To facilitate an understanding of the operation of the entire system, the relay contacts 62, 63 are functionally arranged in the drawing in one instance and again with the complete relay. Contact 62 is identified as a manual heading rate contact and contact 63 is identified as the manual preselected course change or slaving contact.

Associated with contact 63 is one output conductor 64 of an amplifier 66 whose other output conductor 65 is connected to ground, which is common to the ground of precession motor 57 of gyroscope 50. The amplifier 66 includes a pair of A. C. control signal terminals 67, 68 and a pair of A. C. power input terminals 69, 70. The amplifier 66 is of the type well known in the art having a pair of relays which are alternatively energized depending upon the phase relationship of the A. C. signal voltage across signal terminals 67, 68 with respect to the A. C. voltage across power input terminals 69, 70. The operation of one relay in amplifier 66 causes the application of A. C. voltage of one polarity to the relay contact 63 whereas the operation of the other relay causes the application of A. C. voltage of the opposite phase but of the same magnitude to relay contact 63. The amplifier 66 may be of the type disclosed in application Serial Number 22,841, filed April 23, 1948, by Robert J. Kutzler.

Control signals for slaving the gyroscope 50 to stabilize the craft heading or to provide for preselected angular changes in heading of the craft are supplied across signal input terminals 67, 68 from a balanceable synchro network 72. Network 72 comprises a control transformer 73 having a three phase winding 74 and a single phase winding 75. Conductors 76 and 77 connect the opposed end of the single phase winding 75 to signal input terminals 67, 68. Network 72 additionally includes a differential transformer 78 and a transmitter-follower 81. Differential transformer 78 comprises two three-phase windings 79, 80. Winding 80 is symmetrically connected to the three phase winding 74 of control transformer 73. Transmitter-follower 81 comprises a three phase winding 82 and a single phase winding 83. Winding 83 is energized from the source of alternating voltage such as the ship supply. Three phase winding 79 of differential transformer 78 and three phase winding 82 of transmitter-follower 81 are interconnected through a section A1 of the A relay and a section B2 of a (pilot station to remote station) transfer relay B to be described. Relay section A1 comprises three relay arms 85, 86, 87 which respectively coact with relay out contacts 88, 89, 90. The three phase winding 79 has its ends connected by conductors 261, 262, 263 respectively with relay arms 85, 86, and 87. Relay section B2 comprises three relay arms 92, 93, 94 which coact respectively with opposed contacts comprising in contact 95, out contact 96; in contact 97, out contact 98; in contact 99 out contact 100. The three phase winding 82 of transmitter-follower 81 has its ends respectively connected by conductors 60, 84, 71 to relay arms 92, 93, and 94. Out contacts 88, 89, and 90 of relay section A1 are respectively connected to out contacts 96, 98, and 100 of relay section B2.

The three phase windings 74, 79, and 82 are operable with respect to their associated windings 75, 80, and 83. For this purpose, the first winding 74 is supported from a vertical trunnion 102 of an outer gimbal ring 103 of a compass slaved gyroscope 104. The gyroscope 104 taken by itself includes a rotor 105 which is supported about a horizontal spin axis 106 in an inner horizontal gimbal ring 107. The gimbal ring 107 in turn is carried by trunnions 108, 108 in an outer gimbal ring 103 for rotation about a horizontal axis perpendicular to axis 106. The gyroscope 104 includes erecting means (not shown) for maintaining the axis 106 parallel with the surface of the earth. The gyroscope also includes a torque motor 109 for applying torque between trunnions 108, 108 and the outer gimbal ring 103 whereby the rotor 105 will precess about the axis of trunnions 102, 102.

The torque motor 109 is reversibly energized from an amplifier 110. The amplifier has control signals applied thereto from a balanceable network comprising a magnetic compass 111 (which may be of the flux valve type) and a control transformer 112 having a three phase winding 113 and a single phase winding 114. The three phase winding is carried by the upper trunnion 102 of the gyroscope 104. Upon relative change in angular positions of the compass 111 and gyroscope 104, a control signal is induced in single phase winding 114 which is applied to amplifier 110. The amplifier 110 energizes the torque motor 109 whereby the gyroscope 104 will precess about the axis of trunnions 102, 102 until no signal is induced in single phase winding 114 at which time the compass 111 and gyroscope 104 are in corresponding angular positions. Such compass-gyroscope combinations are old in the art as evident from Patent 2,357,319 to Esval et al. and Patent 2,403,091 to W. P. Lear.

The second three phase winding 79 of differential transformer 78 is carried on lower trunnion 56 of the steering gyroscope 50 and rotates therewith.

The third three phase winding 82 is positioned relative to winding 83 as described below, while synchro 81 serves as a transmitter to make preselected angular change in course, from an output shaft 116 of a gear train 115. The shaft 116 has a double pointer 153 affixed thereto for indicating the preselected change in course. To this end, shaft 116 carries a gear 118 which is operatively connected thereto through a magnetic clutch 117 the operating winding 247 of which is separately illustrated therefrom. Gear 118 is in turn driven through a driving pinion 119 carried on a common shaft with a driven gear 120. The gear 120 is rotated by a driving pinion 121 which constitutes the input side of the gear train 115. The driving pinion 121 is carried on an output shaft 122 of a synchro follower or motor 123. Synchro follower 123 includes a three phase winding 124 carried by shaft 122 and a single phase winding 125 energized from the source of alternating voltage. For operating the motor 123, the three phase winding 124 is symmetrically connected to a three phase winding 128 of a synchro transmitter 126. The transmitter includes a single winding 127 connected to the source of alternating voltage.

The operation of the transmitter 126 which is applied to winding 82 is provided by an arrangement wherein the three phase winding 128 is carried by a shaft 129 which supports on its opposite end a pinion 130. Pinion 130 extends axially for a considerable distance and continuously meshes with a pinion 131 carried by a manual turn control shaft 132 having an operating knob 133. Thus rotations of knob 133 result in proportional rotations of winding 82.

To effect selected rates of turn of the aircraft with the knob 133 also used during preselected angular changes in heading, shaft 132 also carries a pinion 134 normally disengaged from a pinion 135 carried by countershaft 136. The gears 134, 135 are engaged by longitudinal movement of shaft 132 provided by pressing on the knob 133 to effectuate selected rates of turn. Shaft 136 carries a slider 137 of a selected rate turn potentiometer 138. Potentiometer 138 includes a resistor 139 which is connected across the ends of a secondary winding 140 of transformer 26 to provide the selected rate turn control signal.

The shaft 136 also carries a peaked cam 141 which has engaged with the periphery thereof one end of a follower arm 142 to control a switching arrangement to utilize the rate signal from potentiometer 138. The opposite end of follower arm 142 carries a contact 143 which on rotation of cam 141 from its normal position engages with an opposed contact 144. A spring 146 connected between arm 142 and a fixed part of the craft causes the follower 142 to be constantly engaged with the surface of cam 141. The contacts 143, 144 control the energization of an operating coil 145 of the A relay which is energized during rate turns.

The A relay comprises a lower A1 section previously mentioned including three operable relay arms; a first intermediate A2 section comprising three operable relay arms; a second intermediate A3 section having one operable relay arm and an upper A4 section having one operable relay arm. The various sections of the relay are described with reference to the portions of the apparatus with which each section is functionally related.

A pilot station 91 in which is located the manually operable knob 133 includes a ship's magnetic heading indicator Figure 1B comprising a synchro receiver or follower 148 having a three phase winding 149 and a single phase winding 150. The synchro follower has a shaft 151 which positions a pointer 152 of a magnetic heading indicator 147 relative to associated indicia. While the pointers 152, 153 have been shown apart, actually they are juxtaposed and coact with the same indicia.

The compass slaved gyroscope 104 supports on its lower trunnion 102 a three phase winding 155 of a synchro transmitter 154. The transmitter 154 includes a single phase winding 156 which is energized from the A. C. supply. Conductors 157, 242, 195; 158, 241, 187; and 159, 240, 183 symmetrically connect the three phase winding 155 of transmitter 154 with the three phase winding 149 of the synchro 148 that positions pointer 152.

A remote control station 161 similar to the pilot's station 91 includes elements which have their counterparts in the pilot's control station 91. Thus, to effect preselected angular changes in heading, there is a manually operable knob 162 for rotating a pinion 163 on shaft 164 the pinion 163 in turn rotating a broad pinion 165. Pinion 165 is carried by shaft 166 of a synchro transmitter 168. Transmitter 168 includes a three phase winding 167 mounted on shaft 166 and a single phase winding 169 which is connected for energization to the ship's supply of alternating voltage. The three phase winding 167 is symmetrically connected to a three phase winding 172 of a synchro follower. The follower includes a single phase winding 171 energized from the ship's supply. The synchro follower 170 has an output shaft 173 carrying a driving pinion 174. Pinion 174 constitutes the input member of a gear train 181 and meshes with a driven gear 175. A shaft supporting driven gear 175 carries driving pinion 176 which meshes with driven gear 177. Gear 177 is operatively connected to shaft 179 through a magnetic clutch 178. The clutch 178 similar to magnetic clutch 117 is of the type that when its control winding 182, illustrated separated therefrom, is energized, rotation of gear 177 is not transmitted to shaft 179. Shaft 179 carries a double pointer 180 associated with suitable indicia for indicating called for values determined from the operation of the manually operable knob 162. Shaft 179 supports additionally a three phase winding 185 of a synchro transmitter-follower 184 corresponding to synchro 81 at the pilots station. The synchro includes a single phase winding 186 connected to the source of alternating voltage.

The three phase winding 185 of the transmitter-follower 184 has the ends thereof connected respectively to in contacts 196, 197, 198 of section A2 of the A relay which is energized during rate turns. Coacting respectively with in contacts 196, 197, 198 are relay arms 199, 200, 201. Additionally, the ends of the three phase winding 185 of transmitter-follower 184 are connected respectively to the relay arms 202, 203, and 204 of section B1 of a B relay. Relay arms 202, 203, 204 coact with out contacts 205, 206, and 207 with said out contacts being symmetrically connected with the three phase winding of synchro generator 154 controlled from the compass gyroscope 104. Section B1 includes in contacts 208, 209, 210 which during energization of the B1 relay respectively connect relay arms 202, 203, 204, with relay contacts 88, 89, and 90 in section A1 of the A relay to effect preselected angular heading change from the remote station 161.

The manually rotatable shaft 164 in the remote control station 161 in order to effect selected rate turns also carries a pinion 212 which may be brought into engagement with the pinion 213 on a counter shaft 214 upon axial movement of shaft 164. The shaft 214 carries a slider 215 of a select rate potentiometer 216. A resistor 217 of the potentiometer is connected across a secondary winding 218 of transformer 26 to provide selected rate control voltage signals. Shaft 214 carries on its opposite end remote from the slider 215 a peaked cam 220. Engaged with the cam periphery is one end of a follower arm 221. The opposite end of arm 221 carries a contact 222 which on rotation of cam 220 from its normal position is brought into engagement with an opposed contact 223 by operation of a spring 224 extending from the follower arm 221 to a fixed part of the craft.

A conductor 226 connects slider 215 with rate of turn contact 62 in section A3 of relay A. The slider 137 of potentiometer 138 in the pilot's controller 91 is similarly connected through conductor 226 to contact 62.

Section A4 of the A relay shown only in the relay in its entirety includes a relay arm 227 and an in contact 228 the function of which will be clarified during the recital of the operation of the arrangement. Similarly section B3 of the transfer relay B and shown only with the relay in its entirety comprises a relay arm 229 which coacts with an out contact 230 and an in contact 231 whose function will be clarified subsequently. Relay B includes an operating winding 255 which has its energization controlled from a single pole manually operable switch 256. D. C. voltage for energizing the A and B relay windings is obtained from a battery 257.

Remote station 161 includes a magnetic heading indicator 188 comprising a synchro receiver 189 having a three phase winding 190 and a single phase winding 191 connected to the ship's supply of alternating voltage. The three phase winding 190 is symmetrically connected to the three phase winding 155 of the synchro transmitter 154. The synchro 189 has an output shaft 192 which positions a pointer 193 relative to indicia 194 to indicate the magnetic heading of the aircraft.

Having described the arrangement in detail and to bring out the functional relationship of the components in the arrangement, the operation of the system as controlled from the pilot station 91 will be initially considered. Since the manner of engaging the servomotor 13 with its control surface forms no part of the present invention and as such is disclosed in the patent to Hamby, it will be assumed that the aircraft has attained a given flight condition at which time the automatic pilot is placed in control of the aircraft. It is assumed that the manual operable knobs 133 and 162 have been placed in normal position when their sliders 137 and 215 are centered with respect to their resistors 139 and 217. The axial position of the knobs 133 and 162 is such that their pinions 134, 212 are disengaged from their related driven pinions 135, 213. The manually operable single pole single throw switch 256 for controlling the B relay is in the unoperated position as shown.

The network 20 for controlling the servomotor amplifier 14 is assumed in a balanced condition with the steering gyroscope operated slider 43 centered on the heading control potentiometer resistor 44. Similarly vertical gyroscope operated slider 33 is centered with respect to resistor 34 with the aircraft in a level position with respect to its roll axis. Follow-up slider 24 is centered on resistor 25.

The compass gyroscope 104 is maintained in alignment with the magnetic compass 111 by means of the compass amplifier 110 and precession motor 109 operating on any misalignment of the compass and gyroscope 104 to realign them. The three phase windings 74 and 155 of the control transformer 73 and synchro transmitter 154 assume a position in accordance with the position of the gyroscope 104.

The steering gyroscope 50 positions the three phase winding 79 of the differential transformer 78 with respect to the winding 80 carried by the craft. The three phase winding 82 of the transmitter-follower 81 at this time or during stabilized heading control is maintained fixed with respect to the craft.

If the steering gyroscope 50 does not wander so that the original angle between the axis 52 of rotor 51 of gyroscope 50 and the axis 106 of rotor 105 of gyroscope 104 does not change synchro network 72 will be in balanced condition. However, should the aircraft deviate from its original heading, the slider 43 of the heading potentiometer 42 will move relative to resistor 44. A voltage is therefore set up between slider 43 and the center tap of secondary winding 45 which unbalances the potentiometer network 20. The unbalance of the network operates the amplifier 14 which in turn causes the servomotor 13 to position its heading control surfaces which may be ailerons. The servomotor 13 simultaneously through the follow-up connection 30 displaces slider 24 relative to resistor 25 to set up an equal and opposite voltage in network 21 to balance network 20. As the aircraft banks under the applied control surface operation, the vertical gyroscope 38 senses the change in bank attitude and operates slider 33 to unbalance the network 20 in the opposite direction from its original unbalance.

The servomotor therefore rotates in the opposite direction to move its aileron control surfaces back to normal position. The craft meanwhile moves toward its original heading. As the change from the original heading decreases, the steering gyroscope 50 moves the slider 43 back towards the center of resistor 44 so that the control surfaces due to the voltage signal from network 31 are displaced in an opposite direction from their normal position and have the effect of decreasing the bank of the aircraft to cause it to conform to the heading deviation. The servomotor continues to follow-up and rebalance the network 20, and the vertical gyroscope 38 upon decrease in attitude of the aircraft causes the control surface to be moved back toward normal position. When the initial heading has been regained, the aileron control surfaces are again in their normal position with the craft in an unbanked attitude.

If the angle between the spin axes of the steering gyroscope 50 and compass gyroscope 104 changes, it is due to the wandering of the steering gyroscope 50 during stabilized flight. The winding 79 of the differential transformer 78 is moved relative to its stationary winding 80 therefore the balanceable synchro network 72 is unbalanced. This unbalance is reflected in a voltage being induced in the single winding 75 of the control transformer 73 which is applied to the amplifier 66. In response to the unbalance signal, the amplifier 66 through its output conductor 64, relay contact 63, relay arm 61, conductor 59 energizes the control winding of the precession motor 57. The motor 57 applies a torque between outer vertical gimbal ring 53 and axis 54 which causes the gyroscope 51 to precess and rotate the gyroscope about the trunnions 56, 56 whereby the three phase winding 79 is moved with respect to the winding 80 until network 72 is in balanced condition.

If the wandering of the steering gyroscope 50 has resulted in a change in heading of the aircraft, the heading of the aircraft will be corrected as before by the heading control potentiometer 42 until slider 43 is again centered on resistor 44.

Magnetic heading indications of the aircraft are provided at the pilot station 91 and the remote station 161 by the compass gyroscope controlled transmitter 154 functioning as a transmitter and causing the positioning of the three phase windings 190 of synchro receiver 189 and three phase winding 149 of the synchro receiver 148.

For preselected changes in heading, the pilot rotates the control knob 133 in accordance with the desired angular change in heading to be made. Rotation of knob 133 through pinion 131 and engaging pinion 130 rotates the three phase winding 128 of the synchro transmitter 126. The synchro transmitter 126 causes its follower 123 to rotate the three phase winding 124 a similar angular extent. This rotation of the three phase winding 124 is transmitted through gears 121, 120, 119, 118, to shaft 116 carrying the three phase winding 82 of the transmitter-follower 81.

Since the three phase winding 82 is symmetrically connected through the out contacts of relay section B₂ and out contacts of relay section A₁ to the three phase winding 79, the rotation of the three phase winding 82 unbalances synchro network 72. The unbalance of network 72 is reflected in a voltage in the control transformer single phase winding 75 which voltage is applied to fixed signal voltage output amplifier 66. This fixed signal is applied to the precession motor 57 which applies a fixed torque to the steering gyroscope 50. The precession of the gyroscope 50 due to the applied torque causes the three phase winding 79 to move relative to its associated winding 80 to balance network 72. When the network is balanced, the amplifier 66 no longer operates.

As the steering gyroscope precesses, the slider 43 of the heading potentiometer 42 is moved relative to resistor 44 to unbalance potentiometer network 20 and cause the operation of the aileron control surfaces. The aircraft now changes heading in a banked attitude at a fixed rate in accordance with the precession rate of gyroscope 50.

When the synchro network 72 has attained a balanced condition due to the craft's change in heading adjusting synchro 73 along with an adjustment of synchro 78, the slider 43 remains fixed in space. As the aircraft continues to turn because of its banked attitude, the resistor 44 has its center moved back toward alignment with slider 43. During this movement of resistor 44 with respect to slider 43, the angle of bank of the aircraft decreases and with the slider 43 aligned with the center of resistor 44 the craft has attained its new heading and the craft is also in an unbanked attitude.

Should the pilot desire to change heading of the craft at a selected rate, he initially axially moves shaft 132 to engage pinions 134 and 135 while maintaining pinions 130, 131 engaged. He then rotates the knob 133 to displace slider 137 relative to resistor 139 in accordance with the rate of turn to be set up. The rotation of the shaft also results in rotation of cam 141 to permit pinion 135 also results in rotation of cam 141 to permit spring 145 to engage contacts 143, 144. The winding 145 of the A relay is thus energized from battery 257 through a circuit comprising conductor 249, contact 144, contact 143, conductor 231, winding 145, to ground and return to battery ground 254. The operation of the A relay at section A1 disconnects the three phase winding 82 of the transmitter-receiver 81 from the three phase winding 79 of the differential transformer 78.

However, the operation of relay section A2, by means of conductors 231, 232, 233 connected from the ends of the winding 82 respectively to relay arms 199, 201, and 200, in contacts 196, 197, 198, conductors 234, 235, 236, relay section B1 relay arms 202, 203, 204, out contacts 205 206 207; conductors 237, 238, 239; conductors 240, 241, 242; and conductors 159, 158, and 157 connects the transmitter-receiver winding 82 to the transmitter three phase winding 155 of the compass gyroscope transmitter 154. At this time the synchro 81 operates as a receiver or motor and causes the positioning of its three phase winding 82 at a rate in accordance with the manually selected change in heading.

The operation of the winding 145 of the A relay additionally completes a circuit from battery 257, conductor 243, section B3 relay arm 229, out contact 230, conductor 244, conductor 245, section A4 relay arm 227, relay contact 228, conductor 246, clutch control winding 247, conductor 248, to ground and return to battery ground 254. With the winding 247 energized the gear 118 is operatively disassociated from its shaft 116 but permits the synchro receiver 82 to position its associated pointer.

The manual displacement of slider 137 of potentiometer 138 relative to resistor 139 sets up a voltage between slider 137 and the center tap of secondary winding 140 which is applied through conductor 226, relay section A3 in contact 62, relay arm 61, conductor 59, to precession motor 57. The energization of the motor 57 is proportional to the displacement of slider 137 and causes the gyroscope 50 to precess at a rate depending upon the voltage from potentiometer 138.

As the steering gyroscope 50 is precessed from motor 57, it moves slider 43 relative to resistor 44 and also moves three phase winding 79 relative to three phase winding 80 in differential transformer 78. The displacement of slider 43 relative to resistor 44 sets up a signal causing banking of the aircraft. As the aircraft is banked it begins to change heading at a rate proportional to the magnitude of the bank angle as it attempts to restore the original relative positions of slider 43 and resistor 44. When the aircraft has attained a banked angle of such a value that its rate of turn or rate of change of heading causes the slider 43 and resistor 44 to maintain their attained relative positions the aircraft is changing heading at the rate set up on the potentiometer 138. At this time there is no relative change in position of the differential winding 79 and the related winding 80.

The three phase winding 74 of the compass gyroscope control transformer 73 is changing positions relative to the single phase winding 75 and in a similar manner the three phase winding 155 of the synchro transmitter 154 is changing its position relative to the single phase winding 156. The synchro receivers 189, 184, 148, and 81 being now controlled from the synchro 154 also cause their three phase windings to be rotated in a similar amount.

When the aircraft approaches a desired heading, the pilot through the control knob 133 restores the slider 137 to the center of resistor 139. The voltage applied to the control winding of the precession motor 57 now descreases and the gyroscope precession rate also decreases.

When the gyroscope is no longer precessed, the slider 43 is held in a fixed position in space and the aircraft under the bank angle continues to change heading until the center of resistor 44 is brought into alignment with the slider 43. At this time the movement of the aircraft under the influence of the residual bank angle causes the differential winding 80 to be moved with respect to the gyro stabilized three phase winding 79 until it assumes its original position relative thereto.

Since the three phase winding 82 of the synchro transmitter-follower 81 has been moved in accordance with the change in heading of the aircraft undergone at a selected rate the synchro control network 72 is in a balanced condition when slider 137 is centered with respect to its resistor 139. With slider 137 thus centered, the contacts 143, 144 are separated causing the relay A to move to its out position thereby disconnecting the three phase winding 82 of the transmitter-receiver 81 from the three phase winding 155 of compass gyroscope transmitter 154 and again connecting it with the three phase winding 79 of the differential transformer 78.

During the time that control is exercised from the pilot station 91 a circuit is completed from battery 257, conductor 243, relay section B3 arm 229, out contact 230, conductor 244, clutch winding 182, conductor 250 to ground and return to battery ground 254. With the clutch control winding 182 energized, the driving gear 177 is operatively disassociated from its shaft 179. The ends of the three phase winding 185 of the transmitter-receiver 184 are connected respectively by conductors 251, 252, 253 to relay arms 202, 203, 204 which are at this time connected to the three phase winding 155 of the compass gyroscope synchro transmitter 154 so that the receiver winding 185 is positioned in accordance with the changes in heading of the aircraft. The rotation of the winding 185 rotates the double pointer indicator 180 in accordance with the called for heading changes.

When control is to be derived from the remote station 161, the pilot closes the single pole single throw switch 256 to energize winding 255 of the transfer relay B. With the B relay operated, the three phase winding 185 of the transmitter-receiver 184 has its ends connected by conductors 251, 252, 253; relay arms 202, 203, 204; in contacts 208, 209, 210; conductors 258, 259, 260, section A1 relay contacts 88, 89, 90; relay arms 85, 86, 87; conductors 261, 262, 263, to the corresponding ends of three phase winding 79 of differential transformer 78.

At the same time in relay section B2 the three phase winding 82 of the transmitter-receiver 81 is disconnected from the three phase winding 79 of differential transformer 78.

At this time the aircraft is stabilized on its heading in a manner similar to that provided with the control station 91 having its transmitter-receiver winding 82 in the input circuit 72 except that this time the transformer-receiver winding 185 is included in said network 72 in place of three phase winding 82.

When selected changes in heading are desired, the remote station operator rotates the control knob 162 while it is in its out position axially to displace transmitter winding 167 relative to its single phase winding 169 and cause thereby the operation of the receiver 170 which rotates its rotor winding 172 relative to the single phase winding 170. This rotation is transmitted to shaft 179 and thence to the three phase transmitter-receiver winding 185. The network 72 is thereby unbalanced and causes the fixed voltage output amplifier 66 to apply a signal to the torque motor 57 which rotates the steering gyroscope 50 to displace three phase winding 79 relative to three phase winding 80 to balance the synchro network. The change in relative positions of windings 79 and 80 is reflected in the relative movements of slider 43 and resistor 44 which cause the aircraft to change heading until the center of resistor 44 is again aligned with slider 43.

During such manual changes in heading it is necessary to cause the three phase winding 82 of the transmitter-receiver 81 to rotate in accordance with the movement of three phase winding 155 relative to its single phase winding 156 so that in the event control is restored to controller 91 the network 72 will be in a balanced condition. For this purpose, the ends of the three phase winding 82 are connected by section B2 relay arms 92, 93, 94; in contacts 95, 97, 99; conductors 271, 272, 273; conductors 240, 241, 242; conductors 159, 158, and 157 to the corresponding ends of three phase winding 155 of the compass gyroscope transmitter 154 so that changes in heading of the aircraft are applied to the three phase winding 82 of the transmitter-receiver 81 and also to the double pointers 264 carried by shaft 116 to indicate changes in craft magnetic heading.

During selected rate changes of heading from remote controller 162, a circuit for energizing the A relay is completed from battery 257, conductor 243, conductor 266, contacts 223, 222, conductor 267, winding 145 of the A relay, to ground and return to battery ground 254. With the A relay operated, voltage signal resulting from the displacement of slider 215 in the rate potentiometer 216 relative to resistor 217 is applied through conductor 226, A3 relay section in contact 62, relay arm 61, conductor 59, to the precession motor 57. Rates of change of heading in accordance with the relative displacement of slider 215 and resistor 217 are effected.

At this time the transmitter-receiver three phase winding 185 is connected by conductors 251, 252, 253; conductors 234, 236, 235; section A2 in contacts 196, 198, 197; relay arms 199, 201, 200; conductors 231, 232, 233; relay arms 92, 94, 93; in contacts 95, 99, 97; conductors 271, 273, 272; conductors 240, 242, 241; conductors 159, 157, 158 to the corresponding ends of three phase winding 155 of the compass gyroscope transmitter 154.

Thus changes in heading of the aircraft relative to the magnetic meridian are reflected by the operation of the three phase winding 185 and shaft 179 carrying the double pointer 180. Thus the transmitter-receiver 184 is conditioned for the resumption of stabilized heading control or preselected changes in heading of a selected angular amount so that it may be connected into the control network 72 after the selected rate turn without a residual signal thereafter causing a lurch in the control of the craft.

It will now be appreciated that there has been provided a novel two station directional control and indicating apparatus for an aircraft which utilizes a compass gyroscope which is slaved at a low rate of precession to a magnetic compass whereby the gyroscope is nonresponsive to perturbations in applied voltages between the compass synchro and gyroscope synchro arising through oscillations of the compass and wherein said apparatus includes a steering gyroscope having a relatively higher precession rate so that its precession rate may be varied to provide selected rates of turn of the aircraft and wherein said steering gyroscope may be further precessed to provide preselected amounts of change in heading at a fixed rate.

Having described my invention what is claimed is:

1. Control apparatus for an aircraft having control surfaces for controlling craft heading, said apparatus comprising: motor means adapted to position said surfaces; a directional gyroscope slaved to a magnetic compass; a second directional gyroscope having precessing means thereon; means interconnected with both gyroscopes and responsive to the differential position of said gyroscopes for controlling said precessing means; manually operable means for selecting a desired rate of change of heading for the aircraft; switching means interconnecting said precessing means with said differential means and manually operable means for disconnecting said precessing means from said differential means and connecting said precessing means to said manually operable means; a signal generator having a part on the aircraft and a second part on the second gyroscope and responsive to relative movement of said second gyroscope and aircraft; and means interconnecting said signal generator and motor means and responsive to said signal generator for energizing said motor means for operating said control surfaces.

2. Control apparatus for an aircraft having control surfaces for controlling craft heading, said apparatus comprising: a first directional gyroscope; means for slaving said gyroscope to a magnetic compass; a second directional gyroscope having precessing means for causing rotation thereof about its vertical axis; a signal generator interconnected with said second gyroscope and aircraft and responsive to relative movement of said second gyroscope and aircraft; motor means connected to said signal generator and responsive to said signal generator for operating said control surfaces; manually operable means for changing craft heading a preselected amount; differential means interconnected with said gyroscopes and manually operable means and responsive to the difference in position of said first gyroscope, said second gyroscope, and said manually operable means for controlling the precessing means for the second directional gyroscope for stabilizing the aircraft heading or effecting manually selected changes in heading.

3. Control apparatus for an aircraft having control surfaces for controlling craft heading, said apparatus comprising: a first directional gyroscope; means for precessing said directional gyroscope at a low rate to align said gyroscope with a magnetic compass; a second directional gyroscope for steering said craft; means for precessing said second gyroscope at a higher rate than said first gyroscope; control means interconnected with said gyroscopes and responsive to the differential positions of said two gyroscopes about their vertical axes for controlling the precessing means for said second gyroscope; manually operable means connected with said control means for changing the relative positions of said two gyroscopes; a two part signal generator having one part carried by the craft and the other part by the second gyroscope and responsive to relative movements of said second gyroscope and aircraft; and motor means connected to the signal generator and responsive to said signal generator for operating said control surfaces to alter craft heading in accordance with the operation of said manually operable means.

4. Control apparatus for an aircraft having control surfaces for controlling craft heading, said apparatus comprising: a first directional gyroscope; means for slaving said gyroscope to a magnetic compass responsive to the earth's magnetic field; a remote indicator; means interconnecting said gyroscope and indicator and responsive to the relative heading position of said first gyroscope and aircraft to operate said indicator; a second directional gyroscope having precessing means; a two part signal generator having one part on the aircraft and the other part on the second gyroscope and responsive to the relative heading positions of said second gyroscope and said aircraft; motor means connected to said signal generator for operating said control surfaces; means interconnected with both gyroscopes and responsive to differential directional positions of the spin axes of the rotors of said gyroscopes for controlling said precessing means; manually operable means for changing the relative directional positions of the spin axes of the rotors of said two gyroscopes and included in said differential position responsive means, for changing selectively the heading of said aircraft.

5. The apparatus of claim 4 with additionally a second remote indicator; means interconnecting the second indicator and manually operable means for operating said second indicator from said manually operable means whereby a comparison may be made from the indicators manually preselected amount of change in heading and the actual magnetic heading of said craft.

6. Control apparatus for an aircraft having control surfaces for controlling craft heading, said apparatus comprising: a first directional gyroscope; means for slaving said gyroscope to a compass responsive to the earth's magnetic field; a remote indicator on said craft connected with said gyroscope and positioned in accordance with the difference in angular directions of said first gyroscope and craft; a second directional gyroscope; precessing means for said second directional gyroscope; a signal generator having a part carried by the craft and a part on the second gyroscope responsive to relative positions of said second gyroscope and aircraft; motor means connected to the signal generator responsive to said signal generator for operating said control surfaces; a manually operable preselected heading changer; control means interconnected with both gyroscopes and the manually operable changer and responsive to the relative positions of said two gyroscopes and said changer and connected to the precessing means for operating the precessing means for said second gyroscope; manually operable means for changing heading at selected rates; switching means for connecting said precessing means solely to said manually operable means; and means interconnecting said first gyroscope and changer for adjusting said changer during selected rates of turn of said aircraft to maintain said control means in a null condition.

7. Control apparatus for an aircraft having control surfaces for controlling craft heading, said apparatus comprising: a first directional gyroscope; means for slaving said gyroscope to a magnetic compass; a second directional gyroscope; precessing means on said second directional gyroscope for applying a torque thereto about a horizontal axis thereof; means interconnected with both gyroscopes and responsive to the differential position in heading of the spin axes of the rotors of said gyroscopes for controlling said precessing means; a pair of remote control stations; a manually operable means at each station for selecting the desired rate of change in heading; switching means for disconnecting said precessing means from said differential means and connecting said precessing means to both said manually operable means; a signal generator having a part carried by the craft and a part carried by the second gyroscope and responsive to relative positions of said second gyroscope and aircraft; and motor means connected to said signal generator and controlled thereby for operating said control surfaces.

8. Control apparatus for an aircraft having control surfaces for controlling craft heading, said apparatus comprising; a compass gyroscope adapted to be slaved to a magnetic compass and having relatively low precession rates for aligning said gyroscope and said compass, said low precession rate rendering said gyroscope nonresponsive to oscillations of said compass and said gyroscope having low erection rates for maintaining said rotor axis parallel to the surface of the earth; a second directional gyroscope for steering said craft and having means thereon for precessing it about its vertical axis at a higher rate than said compass gyroscope is precessed; control means interconnected with both gyroscopes and precessing means and responsive to the differential heading position of both of said gyroscopes for controlling the precessing means of said second gyroscope; manually operable means connected with said control means for selecting a predetermined relative angular change of heading of said two gyroscopes; a signal generator having a part carried by the craft and a part on the second gyroscope and responsive to relative movement of said second gyroscope and aircraft; and means connected to said signal generator for operating said control surfaces.

9. Control apparatus for an aircraft, said apparatus comprising: a first directional gyroscope; means thereon for applying a torque thereto for causing its movement about a vertical axis; means responsive to a change in the relative positions of said gyroscope and a compass for causing operation of said torque means to cause relatively slow precession of said gyroscope to restore it to alignment with said compass; a second directional gyroscope; a second torque means for said second gyroscope; means interconnected with both gyroscopes and second torque means and responsive to the difference in horizontal angular position of the spin axes of the rotors of said first and second gyroscopes to energize the torque means for said second gyroscope to restore it to alignment with said first gyroscope; means for rendering said first gyroscope ineffective to control said torque means for said second gyroscope; and means connected with said second torque means for energizing said torque means for said gyroscope to cause said second gyroscope to precess at selected rates.

10. Control apparatus for an aircraft having a first and second directional gyroscope, each gyroscope having means for maintaining the gyroscope rotor spin axis in a normally horizontal position, said apparatus comprising: precessing means on said first gyroscope for maintaining it aligned with a magnetic direction; precesssing control means for said second gyroscope including means connected to both gyroscopes and responsive to relative angular displacement in heading of said two gyroscopes for maintaining said second gyroscope aligned with said first gyroscope; means for severing control of said precessing means for the second gyroscope from said first gyroscope; manually selected means connected with the precessing control means for operating said precessing means of said second gyroscope to alter the relative angular positions in heading of said two gyroscopes at selected rates; a signal generator having a part on the craft and a part on the second gyroscope responsive to the misalignment of said second gyroscope and craft; and means connected to said signal generator and controlled thereby for maintaining said second gyroscope and said aircraft aligned.

11. Control apparatus for an aircraft having control surfaces for controlling craft heading, said apparatus comprising: a directional gyroscope; a signal generator connected with the gyroscope and operated by said gyroscope upon relative angular displacement in heading of said aircraft and gyroscope; motor means connected to the signal generator and controlled by said signal generator for operating said control surfaces; torque means on said gyroscope for effecting precession of said gyroscope about its vertical axis; a manually operable preselected heading angle changer; control means interconnecting said gyroscope and changer with said torque means and controlled by said gyroscope and manually operable changer for energizing said torque means; further means energizing said torque means to effect precession of said gyroscope at selected rates; and aligning means connected with the gyroscope and changer and controlled by angular movement of said gyroscope at said selected rates for causing a repositioning of said first manually operable changer to maintain an angular alignment thereof with said gyroscope.

12. Control apparatus for an aircraft comprising: a directional gyroscope having its rotor normally in a horizontal plane relative to the earth's surface; a differential synchro transformer having one part stabilized from the vertical axis of said gyroscope; a synchro transmitter having one winding connected to a source of alternating voltage and the other winding manually relatively displaceable with reference thereto; a control transformer having its output winding connected to a fixed signal output amplifier; means for connecting said synchro transmitter, said differential transformer, and said control transformer in a balanceable network; precessing means on said gyroscope for effecting rotation thereof about its vertical axis and connected to said amplifier; a signal generator on the gyroscope and craft operated upon relative angular heading displacements of said craft and gyroscope for controlling craft heading; means for disconnecting said amplifier from said precessing means; means alternatively connected with said precessing means for energizing said precessing means to precess said gyroscope at selected variable rates; a second synchro transmitter; means for stabilizing the rotor of said second transmitter and the winding of said control transformer from a heading position maintaining device; and means selectively interconnecting the second synchro transmitter to the first synchro transmitter for positioning said first synchro transmitter from said second transmitter during angular change of said gyroscope position about its vertical axis at selected variable rates.

References Cited in the file of this patent

UNITED STATES PATENTS

| | | |
|---|---|---|
| 2,515,349 | Kutzler et al. | July 18, 1950 |
| 2,539,411 | Esval et al. | Jan. 30, 1951 |
| 2,561,873 | Kutzler | July 24, 1951 |
| 2,611,559 | Meredith | Sept. 23, 1952 |
| 2,614,776 | Rossire | Oct. 21, 1952 |

FOREIGN PATENTS

| | | |
|---|---|---|
| 624,201 | Great Britain | May 30, 1949 |

UNITED STATES PATENT OFFICE

CERTIFICATE OF CORRECTION

Patent No. 2,757,887 August 7, 1956

Wayne A. Stone

It is hereby certified that error appears in the printed specification of the above numbered patent requiring correction and that the said Letters Patent should read as corrected below.

Column 13, line 4, before "manually" insert -- between the --.

Signed and sealed this 11th day of February 1958.

(SEAL)
Attest:

KARL H. AXLINE
Attesting Officer

ROBERT C. WATSON
Commissioner of Patents